United States Patent [19]
Lerminiaux et al.

[11] Patent Number: 5,542,014
[45] Date of Patent: Jul. 30, 1996

[54] INTEGRATED OPTICAL COUPLER WITH TWO INPUTS AND 2N OUTPUTS

[75] Inventors: Christian Lerminiaux, Fontainebleau; Denis M. Trouchet, Quincy-sous-Senart, both of France

[73] Assignee: Corning Incorporated, Corning, N.Y.

[21] Appl. No.: 357,518

[22] Filed: Dec. 16, 1994

[30] Foreign Application Priority Data

Dec. 29, 1993 [FR] France ................................... 93 15808

[51] Int. Cl.$^6$ ......................................................... G02B 6/26
[52] U.S. Cl. .................................. 385/45; 385/14; 385/50
[58] Field of Search .............................. 385/39, 14, 16, 385/17, 20, 21, 22, 24, 48, 50, 129, 132

[56] References Cited

U.S. PATENT DOCUMENTS

| | | | |
|---|---|---|---|
| 4,760,580 | 7/1988 | Thompson et al. | 385/45 |
| 5,222,167 | 6/1993 | Jean et al. | 385/45 |
| 5,233,453 | 8/1993 | Sivajan et al. | 385/45 |
| 5,297,233 | 3/1994 | Lerminiaux | 385/27 |
| 5,311,604 | 5/1994 | Rogner et al. | 385/14 |
| 5,394,489 | 2/1995 | Koch | 385/45 |

FOREIGN PATENT DOCUMENTS 2680418  8/1991  France .
2231412  11/1990  United Kingdom .

OTHER PUBLICATIONS

*Electronic Letters*, vol. 28, No. 7, 26 Mar. 1992, Stevenage GB, pp. 644–645.
*Applied Optics*, vol. 23, No. 17, Sep. 1984 pp. 2991–2998.
*Optical Fiber Communication Conf. 1989*, Tech. Digest Series, vol. 5, Feb. 1989, p. 90.

*Primary Examiner*—John Ngo
*Attorney, Agent, or Firm*—William Greener

[57] ABSTRACT

The invention comprises (a) a divider (D) by 2 of the optical power received at one input ($E_1$, $E_2$) and (b) two groups of single mode waveguides coplanar to the divider and symmetrical relative to the axis of symmetry (Z) of the divider (D), each group being composed of waveguide sections connected in tree and branch fashion by Y junctions ($J_{ij}$) between one input junction ($J_{11}$, $J_{12}$) connected to one of the outputs of the divider and N sections of waveguide difining N outputs ($S_1$ to $S_{16}$) of the coupler parallel to the axis of the divider. According to the invention, each of these input junctions ($J_{11}$, $J_{12}$) has a rectilinear input branch ($B_1$) with predetermined length such that the transverse distribution of the optical power at the output of the rectilinear input branch ($B_1$) is centered to a large degree on the axis of this input branch.

5 Claims, 3 Drawing Sheets

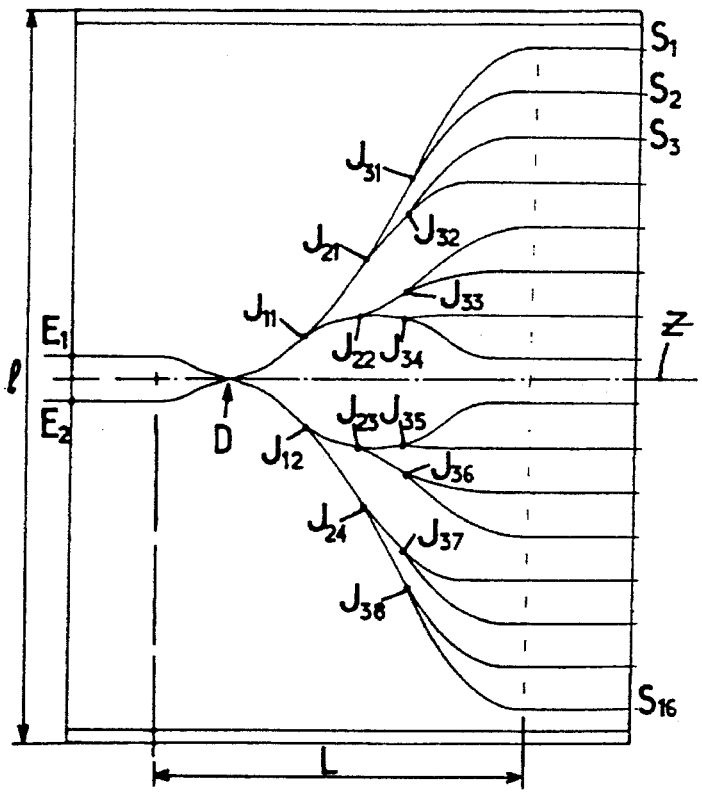
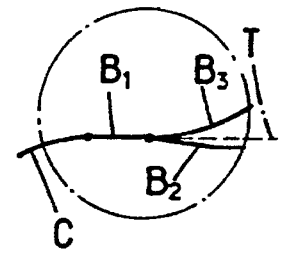
*Fig. 2A*
*Fig. 1*
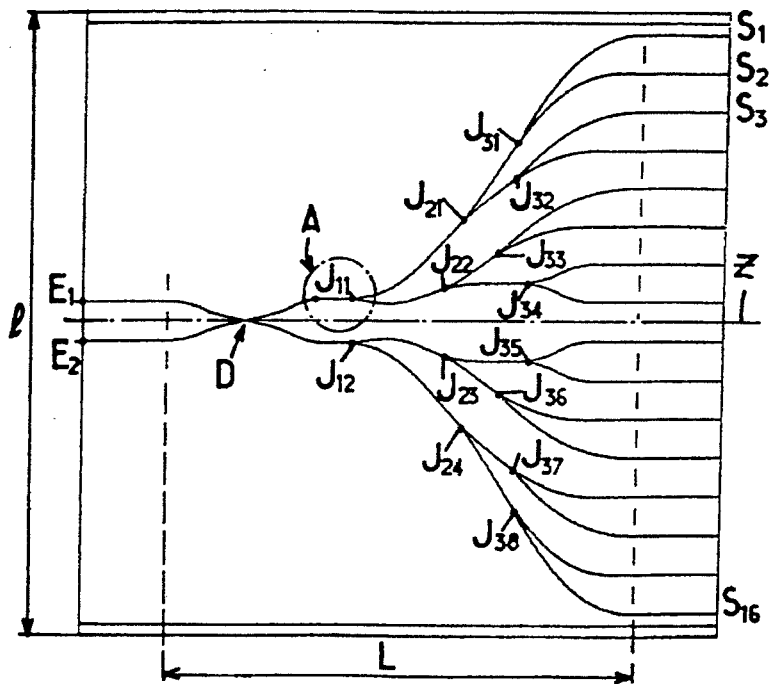
*Fig. 2*

INTEGRATED OPTICAL COUPLER WITH TWO INPUTS AND 2N OUTPUTS

FIELD OF THE INVENTION

This invention relates to an integrated optical coupler with 2 inputs and 2N outputs, and in particular to such a coupler with improved achromaticity.

BACKGROUND OF THE INVENTION

FIG. 1 of the attached drawings shows the layout of a coupler with two inputs $E_1$, $E_2$ and 16 outputs $S_1$ to $S_{16}$, of a type known from French patent application no. 2,680,418 filed in the name of the Applicant (see corresponding U.S. Pat. No. 5,297,233 issued on Mar. 22, 1994, entitled "Integrated Optics Achromatic Splitter And An MXN Coupler Incorporating Such A Splitter")(see in particular FIGS. 9 and 10 of this document). Such a coupler is made, for example, by ion exchange on a glass substrate through a mask defining the configuration of waveguides connecting the two inputs to the sixteen outputs. As described in the aforementioned French patent application, the coupler essentially comprises a divider D and two groups of waveguides, each connected to one of the two divider outputs. Divider D comprises an "X" junction of two identical rectilinear waveguides, single mode at the wavelength used. This junction is connected to inputs $E_1$, $E_2$ in such a way that the optical power received from one of the two inputs is divided equally between its two output branches. To do this, as described in the aforementioned French patent application, the guides of junction D are inclined at an angle of roughly 1° on axis of symmetry Z of the junction which is parallel to the general direction of light propagation, with coupler inputs and outputs connected to the waveguide branches parallel to axis Z.

Note that the waveguide layout shown in FIG. 1 is very strongly distorted in a ratio of approximately 10, parallel to this axis of symmetry which amplifies the curves in the waveguides; this improves clarity of the figure. Thus, the 2×16 coupler shown as an example can be formed on a substrate with a transverse dimension from about 1 to 6 mm for a longitudinal dimension L of around 46 mm, measured between the starts of the rectilinear input and output waveguide branches; these inputs and outputs having a transverse distribution interval of 350 micrometers.

The two groups of coplanar single mode waveguides connected to the 2 outputs of divider D are symmetrical relative to axis Z of the divider, with each group being composed of waveguide sections connected in the manner of a tree and branches by junctions $J_{ij}$ in a Y form, between an input junction $J_{11}$, $J_{21}$ respectively, connected to one of the outputs of the divider, and the N branches being rectilinear and parallel to axis Z of the divider, defining the N outputs $S_1$ to $S_8$ on the one hand and $S_9$ to $S_{16}$ on the other hand, of the coupler. A 1 to N coupler with such a tree and branches waveguide structure is described in French patent no. 2,676,548 (corresponding to U.S. application Ser. No. 876,954 filed on May 17, 1991) filed by this applicant, this coupler being characterized by the lack of deflection points on the different waveguides outside of the junctions themselves, a layout which ameliorates the longitudinal compactness of the coupler.

Couplers such as the one in FIG. 1 are used primarily in telecommunications, especially in frequency bands centered around 1310 nm and 1530 nm, that is, 1260 nm-1360 nm and 1480 nm-1580 nm, respectively. In these bands, then, it is important that division of optical power between outputs $S_1$ to $S_{16}$ have as few chromaticity flaws as possible.

FIG. 3 shows attenuation of optical powers at various outputs $S_1$ to $S_{16}$ of the coupler in FIG. 1, compared to the optical power injected into one of inputs $E_1$, $E_2$. These attenuations present themselves in particular in the first of two frequency bands mentioned above (that is, 1310±50 nm and 1530±50 nm) as strong spectral oscillations which are a function of wavelength, between 0.5 and 1 dB inclusive, which show an achromaticity capable of having a significant effect on the uniformity of optical powers at the coupler outputs. Likewise there is considerable "noise" at the outputs of the second frequency band, around 1530 nm. These phenomena persist even if a rectilinear waveguide section, for example 1 mm long, is positioned between divider D and the curved parts of the waveguides which connect it to input junctions $J_{11}$ and $J_{12}$.

This achromaticity flaw can be attributed to the fact that the mode profile at the output of an X junction is considerably deformed, more so than at the output of a simple Y junction, and that an X junction such as this one is less adiabatic.

The object of this invention is an integrated optical coupler with two inputs and 2N outputs which does not have a chromaticity flaw like the one in FIG. 1.

SUMMARY OF THE INVENTION

This object of the invention, as well as other objects which will be discussed in the description below, are achieved by an integrated optical coupler with 2 inputs and 2N outputs, of a type comprising (a) a divider composed of an X junction of two identical rectilinear waveguides, single mode at the wavelength used, inclined one on top of the other in such a way as to equally divide between the two junction outputs the optical power received at an input of the junction, the junction having an axis of symmetry following the general direction of light propagation, and (b) two groups of single mode waveguides which are coplanar to the divider and symmetrical relative to the axis of symmetry of the divider, each group being composed of waveguide sections connected in tree and branch fashion by Y junctions between an input junction connected to one of the outputs of the divider and N waveguide sections defining N outputs of the coupler parallel to the axis of the divider. According to the invention, each of these input junctions has a rectilinear input branch with predetermined length such that transverse distribution of optical power at the output of the rectilinear input branch is centered to a large degree on the axis of this input branch.

As will be shown later, this layout ensures better uniformity of the division of optical power at the outputs of the coupler and improves achromaticity of the latter.

Each of the input junctions of the coupler according to the invention has two curved output branches symmetrical relative to a common tangent collinear to the axis of the input branch and parallel to the axis of symmetry of the divider.

This layout again advantageously reinforces the uniformity of division of the optical power and achromaticity of the coupler according to the invention°

BRIEF DESCRIPTION OF THE DRAWINGS

Other characteristics and advantages of the coupler according to the invention will be given in the description below and shown by the attached drawings in which:

FIG. 1 is a schematic diagram of a 2 by 2N coupler according to the prior art already described in the introduction of the specification.

FIG. 2 and 2A are schematic diagram of a 2 by 2N coupler according to the invention.

DETAILED DESCRIPTION OF THE INVENTION

Figure 3:
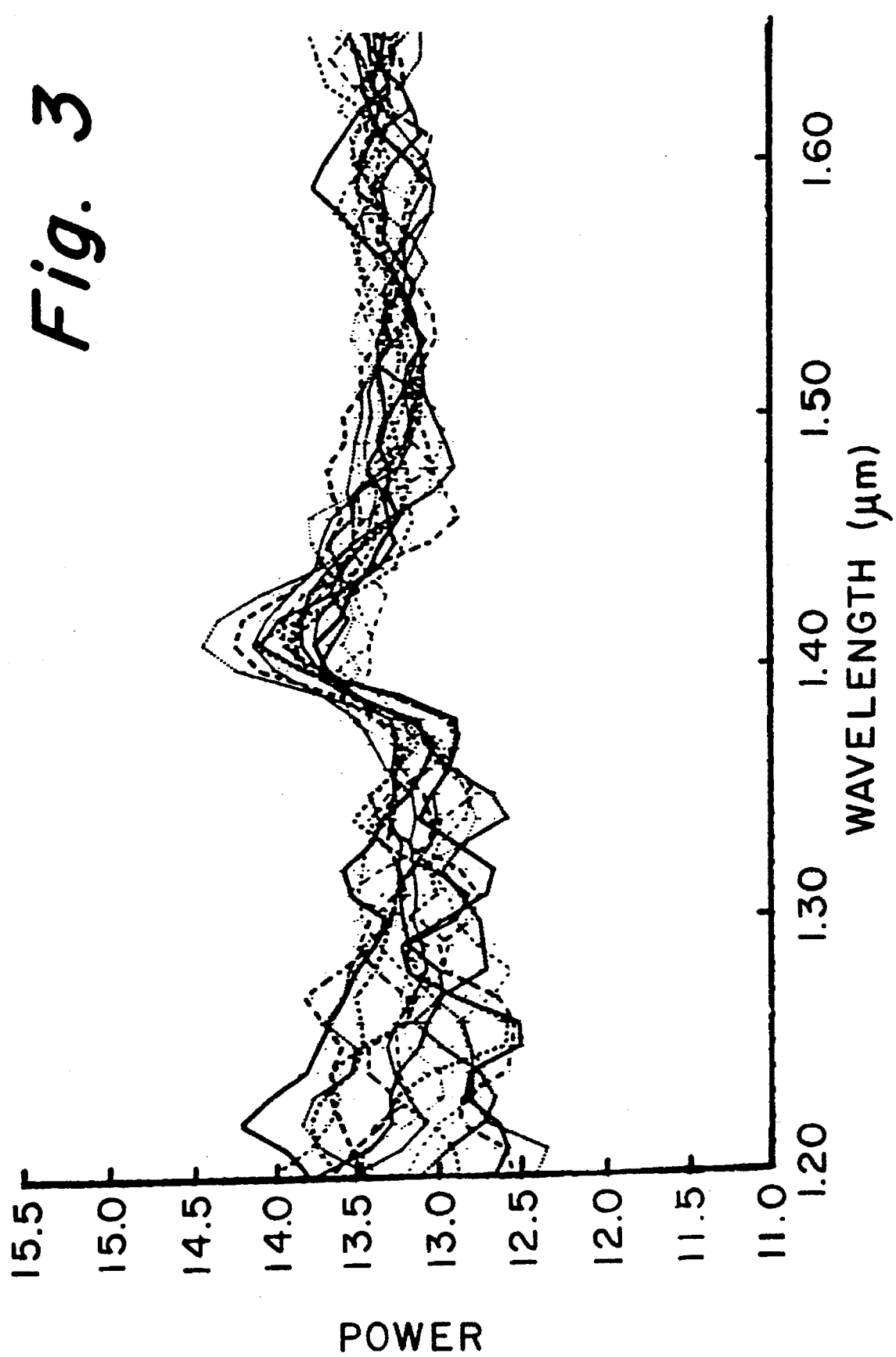
FIGS. 3 and 4 are graphs of the optical powers at the outputs of the couplers in FIGS. 1 and 2 respectively as a function of the wavelength of the light injected into these couplers.

Refer to FIG. 2 of the attached diagrams which shows by way of example a 2 by 2N coupler according to the invention. FIG. 2 shows that the coupler according to the invention, whose representation is distorted like that of the coupler in FIG. 1, comprises as does the latter a divider D and two waveguide groups whose "y" input junctions $J_{11}$, $J_{12}$ are each connected to one of two outputs of divider D. The latter is entirely in conformity with the one described in connection with FIG. 1. The waveguide groups connected to the outputs of divider D are of the tree and branch type such as those of the coupler in FIG. 1.

According to the invention, input junctions $J_{11}$, each have a rectilinear input branch of predetermined length, labelled $B_1$ for junction $J_{11}$ (see FIG. 2A, a blowup of A in FIG. 2). Junction $J_{11}$ also has two output branches $B_2$, $B_3$ which are curved and symmetrical relative to a common tangent T. As discussed earlier, junction $J_{12}$ is symmetrical to junction $J_{11}$ and therefore we shall restrict ourselves to describing the latter below.

According to one essential characteristic of the coupler according to the invention, the length of input branch $B_1$ of junction $J_{11}$ is chosen so that the transverse distribution of the optical power at the output of this input branch is to a large degree centered on the axis of this input branch.

It is known that in a single mode waveguide, the transverse distribution of optical power, or "mode profile" is considerably gaussian and is normally centered on the axis of the guide. This profile remains rather constant in the case of propagation in a rectilinear waveguide. On the other hand, it goes off-center when the guide curves, which favors an unequal division of the optical power between the two output branches of a Y junction.

Returning to the coupler in FIG. 1, junction $J_{11}$ is preceded by a strongly curved waveguide branch positioned between one output of divider D and this junction to ensure transverse deployment of the waveguides, as a function of their spacing (350 micrometers for example) and the number 2N of coupler outputs. This curvature causes the mode profile to go dramatically off-center upstream of junction $J_{11}$, thus producing a strong dissymmetry of the distribution of the optical power transmitted to junctions $J_{21}$ and $J_{22}$.

This dissymmetry is further exacerbated by divider D itself which, due to the geometry of the intersection of its two constituent waveguides, introduces a bimodality in propagation of the light received from one of these single mode guides, a bimodality which is disadvantageous to centering of mode profiles which propagate towards junctions $J_{11}$ and $J_{12}$.

According to the invention, one corrects these offcenter shifts upstream of junctions $J_{11}$, $J_{12}$ that force the light to propagate in rectilinear waveguide branches such as the branch of input $B_1$ of junction $J_{11}$, these rectilinear branches serving to re-center favorable modes and promote restoration of single mode, centered propagation of light downstream of the junction.

A rectilinear waveguide in fact ensures filtering of the transmitted light suitable for re-centering an off-center mode profile. Thus the off-center shift of the wave mode which propagates upstream of branch $B_1$ progressively disappears as it progresses in this rectilinear branch.

Of course this branch has to be of a length sufficient to enable the desired re-centering to take place. The length of rectilinear branch $B_1$ must then be chosen as a function of the desired degree of re-centering. As can be observed below in connection with FIG. 4, by giving branch $B_1$ a length of between 1 and 3 mm, the desired achromaticity, linked to the uniformity of distribution of the optical power between the coupler outputs, is achieved.

The achromaticity of the coupler according to the invention can be further improved by arranging tangent T common to the three branches of junction $J_{11}$ so as to be parallel to axis Z of the divider.

In fact, as described earlier, the waveguides of the coupler according to the invention are obtained in the classic manner by ion exchanges with the glass of the substrate through a mask. The mask is designed and defined on a surface cut out of square image elements laid out in lines parallel to axis Z, and in columns, when using a computer to do this, as is common now. If these image elements are being used to design nonparallel junctions, as is the case for junctions $J_{11}$, $J_{12}$ of the coupler in FIG. 1, the edges of the designed waveguides, normally deformed by an indentation caused by the image elements used, have overly large dissymmetrical indentations which themselves can introduce corresponding dissymmetries in propagation of light in the waveguides obtained from a mask such as this one. Arranging the axes of junctions $J_{11}$, $J_{12}$ parallel to axis Z according to the invention ensures the symmetry of the indentations on the edges of the waveguides of these junctions on the mask and thus removes one of the causes of distortion in distribution of the light between the various outputs of the coupler; this is one of the aims of the invention.

Figure 4:
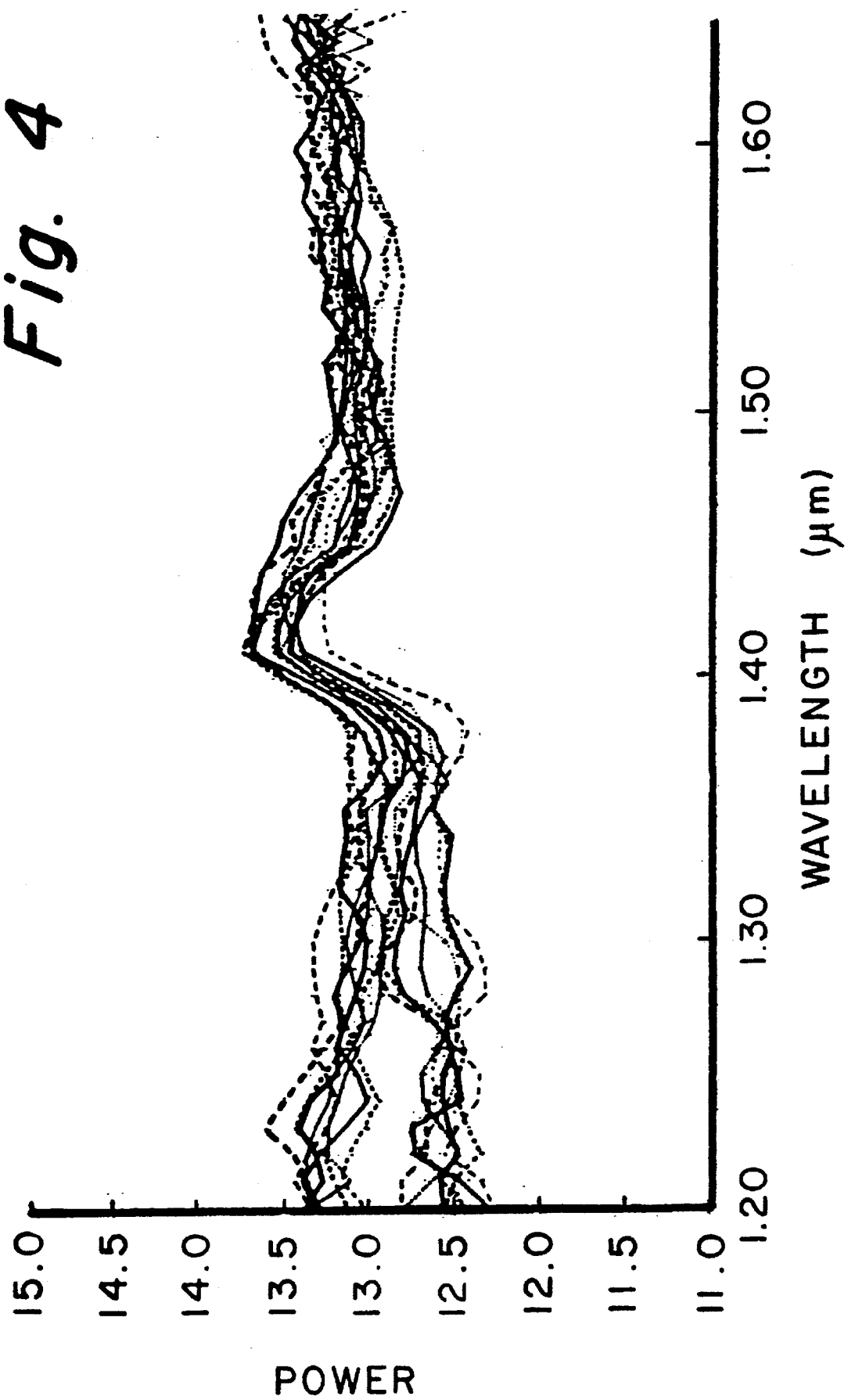

The graphs in FIG. 4 are similar to those in FIG. 3 and chart the progression, as a function of wavelength, of the power transmitted to each of the sixteen outputs of the coupler according to the invention, shown in FIG. 2. It is immediately apparent by comparison to the graphs in FIG. 3 that the spectral oscillations that affect achromaticity of the coupler in FIG. 1 in the waveband 1310±50 nm have been considerably reduced in the coupler according to the invention. The situation is the same in the second waveband used in telecommunications (1530±50 nm), where confinement of output optical powers and excellent achromaticity are observed throughout the bandwidth.

In this regard, it should be mentioned that spectral oscillations visible in FIG. 3 in the first waveband are due to a flaw in separation of the light in one or more of the Y junctions of the coupler in FIG. 1. Division of the light between the two output branches of such a junction is not equal then; this inequality results from an interferometric effect at the heart of the junction, as a function of the wavelength. Spectral curves at the outputs of a Y junction then present sinusoidal and complementary paths, with the maximum light at one output corresponding to the minimum on another.

The achromaticity flaw can then be characterized by the amplitude of these spectral oscillations. Reduction of the amplitude of these oscillations obtained by using this invention is thus linked to a more equal division of the light in all the Y junctions of the coupler according to the invention; this boosts the estimation of overall quality of the coupler, evaluated based on the poorer optical performances observed at the outputs at all wavelengths of the two aforementioned frequency bands.

These advantages are obtained at the price of a slight increase in length L of the component which ranges for example from 46 mm for the coupler in FIG. 1 to 55 mm for the one in FIG. 2, which is very acceptable, taking into account the improvement in the optical performance.

In the diagram of the coupler in FIG. 2, note that the waveguides spaced the farthest apart on axis Z have no inflection points outside of the junctions, in conformance with the teachings in aforementioned French patent 2,676, 548. On the other hand, layout requirements may lead the designer to locally plan inflection points 25 between junctions for the closest guides on this axis, as is the case for example between junctions $J_{11}$ and $J_{22}$ on the one hand, and $J_{12}$ and $J_{23}$ on the other.

Of course, the invention is not limited to the embodiment described and shown which has only been given by way of example. Thus, the invention can be used advantageously in couplers with a number of outputs other than 16, for example 8 or 32.

We claim:

1. An integrated optical coupler with two inputs and 2N outputs comprising (a) a divider composed of an "X" junction forming two divider inputs and two divider outputs, said X junction composed of two identical rectilinear waveguides, single mode at the wavelength used, and being inclined one on top of the other in such a way as to equally divide between the two divider outputs the optical power received at one of the divider inputs, the divider having an axis of symmetry following the general direction of light propagation, and (b) two groups of single mode waveguides coplanar to the divider and symmetrical relative to the axis of symmetry of the divider, each group being composed of waveguide sections connected in tree and branch fashion by a plurality of Y junctions between an input junction connected to one of the outputs of the divider and N waveguide sections defining N outputs of the coupler parallel to the axis of the divider, wherein each of the input junctions has a rectilinear input branch with predetermined length such that transverse distribution of the optical power at the output of the rectilinear input branch is substantially centered on the axis of the rectilinear input branch.

2. The coupler according to claim 1, wherein each of the input junctions also has two output branches curved symmetrically relative to a common tangent collinear to axis of the rectilinear input branch and parallel to the axis of symmetry of the divider.

3. The courier according to claim 1, wherein $N \geqq 4$.

4. The coupler according to claim 1, wherein the waveguides connecting the input junctions to the waveguide sections defining the outputs of the coupler which are not adjacent to the axis of symmetry of the divider have no inflection points outside the plurality of Y junctions.

5. The coupler according to claim 1 wherein the predetermined length of the rectlinear input branch is in the range of about 1 mm to 3 mm.

* * * * *